US012597147B2

(12) United States Patent
Moore

(10) Patent No.: US 12,597,147 B2
(45) Date of Patent: Apr. 7, 2026

(54) IMAGE CORRELATION PROCESSING BY ADDITION OF REAGGREGATION

(71) Applicant: EM Microelectronic-Marin SA, Marin (CH)

(72) Inventor: Brian Moore, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 389 days.

(21) Appl. No.: 18/302,252

(22) Filed: Apr. 18, 2023

(65) Prior Publication Data

US 2023/0419514 A1 Dec. 28, 2023

(30) Foreign Application Priority Data

Jun. 28, 2022 (EP) .................................... 22181600

(51) Int. Cl.
*G06T 7/32* (2017.01)
*G06F 3/03* (2006.01)
(Continued)

(52) U.S. Cl.
CPC .............. *G06T 7/32* (2017.01); *G06F 3/0304* (2013.01); *G06F 3/03543* (2013.01); *G06T 7/74* (2017.01)

(58) Field of Classification Search
CPC .. G06T 7/32; G06T 7/74; G06T 7/248; G06T 7/246; G06T 3/4038; G06T 7/001;
(Continued)

(56) References Cited

U.S. PATENT DOCUMENTS 7,122,781 B2 * 10/2006 Rotzoll ................. G06F 3/0317
250/221
7,295,183 B2 * 11/2007 Willemin .............. G06F 3/0421
345/5
(Continued)

FOREIGN PATENT DOCUMENTS

CN 1690938 A * 11/2005 ........... G06F 3/0317
CN 118778236 A * 10/2024 ........... G06T 7/0002
WO 91/20054 A1 12/1991

OTHER PUBLICATIONS

Dimitrios Konstantinidis et al. "Phase Amplified Correlation for Improved Sub-Pixel Motion Estimation" Jan. 2019, IEEE (Year: 2019).*

(Continued)

*Primary Examiner* — Aaron W Carter
*Assistant Examiner* — Alejandro Hernandez
(74) *Attorney, Agent, or Firm* — Sughrue Mion, PLLC

(57) ABSTRACT

A method of image correlation includes: obtaining a first image frame with a set of distinct features; obtaining a second image frame at least partially overlapping the first image frame; carrying out a cross-correlation operation of the first and second image frames to obtain a cross-correlation result indicating correlation values for different offset positions of the second image frame with respect to the first image frame, the highest correlation value with its associated offset position in the cross-correlation result indicating the most likely offset position of the second image frame with respect to the first image frame; and carrying out a reaggregation operation of the cross-correlation result to generate a distinct global maximum correlation value from a plurality of non-distinct correlation values in an aggregated cross-correlation result. The reaggregation operation (Continued)

Reaggregated Cross-correlation involves carrying out a convolution of the cross-correlation result with a 1×2, 2×1, or 2×2 array of 1's.

15 Claims, 14 Drawing Sheets

(51) Int. Cl.
  *G06F 3/0354* (2013.01)
  *G06T 7/73* (2017.01)
(58) Field of Classification Search
  CPC . G06T 7/0002; G06T 7/30; G06T 5/20; G06F
  3/0304; G06F 3/03543; G06F 3/0317;
  G06F 3/03; H04N 1/04; G01B 11/14;
  G02B 21/367
  See application file for complete search history.

(56) References Cited

U.S. PATENT DOCUMENTS

| | | | | |
|---|---|---|---|---|
| 8,160,364 | B2 * | 4/2012 | Lam | G06T 7/337 |
| | | | | 382/190 |
| 8,432,448 | B2 * | 4/2013 | Hassapis | G08B 13/19641 |
| | | | | 382/103 |
| 11,538,135 | B2 * | 12/2022 | Ely | G01C 11/02 |
| 11,625,826 | B2 * | 4/2023 | Wakeford | G06N 5/01 |
| | | | | 382/131 |
| 11,967,089 | B2 * | 4/2024 | Wang | G06T 7/246 |
| 11,995,895 | B2 * | 5/2024 | Shin | G06T 1/20 |
| 2004/0175019 | A1 * | 9/2004 | Howard | G06V 20/13 |
| | | | | 382/103 |
| 2005/0185059 | A1 * | 8/2005 | Ohki | H04N 23/68 |
| | | | | 348/208.99 |
| 2005/0206614 | A1 * | 9/2005 | Brosnan | G01M 11/00 |
| | | | | 345/156 |
| 2007/0075888 | A1 * | 4/2007 | Kelly | H04N 25/772 |
| | | | | 341/155 |
| 2008/0246725 | A1 | 10/2008 | Brosnan et al. | |
| 2009/0304288 | A1 * | 12/2009 | Rohaly | G06T 7/223 |
| | | | | 382/219 |
| 2013/0219351 | A1 * | 8/2013 | Shim | G03F 1/70 |
| | | | | 716/55 |
| 2014/0210725 | A1 * | 7/2014 | Lee | G06F 3/0317 |
| | | | | 345/166 |
| 2018/0068431 | A1 * | 3/2018 | Takeda | G06T 7/74 |
| 2019/0297295 | A1 * | 9/2019 | Roberts | G01J 1/44 |
| 2021/0100447 | A1 * | 4/2021 | Wakeford | G06T 7/143 |
| 2022/0133241 | A1 * | 5/2022 | Jones | A61B 5/1032 |
| | | | | 600/485 |
| 2023/0116000 | A1 * | 4/2023 | Novikov | H04N 25/134 |
| | | | | 348/273 |
| 2023/0316510 | A1 * | 10/2023 | Jia | G06V 40/197 |
| | | | | 382/131 |
| 2023/0328386 | A1 * | 10/2023 | Tang | H04N 23/12 |
| | | | | 348/164 |
| 2024/0412412 | A1 * | 12/2024 | Lev | G06T 7/174 |
| 2025/0131733 | A1 * | 4/2025 | Wilf | G06T 7/20 |
| 2025/0224208 | A1 * | 7/2025 | Moseman | F41G 3/142 |

OTHER PUBLICATIONS

Misganu Debella-Gilo et al., "Sub-pixel precision image matching for measuring surface displacements on mass movements using normalized cross-correlation", Remote Sensing of Environment, 2011, pp. 130-142, vol. 115.

European Search Report of EP 22 18 1600 dated Dec. 2, 2022.

* cited by examiner

Reaggregated Cross-Correlation - Subpixel Motion

Cross-correlation

```
0   1   0   1   2
1   1   6   2   1
2   1   8   4   2
3   0   1   0   2
1   0   0   1   1
```

Reaggregated Cross-correlation

```
0   1   1    1    3   2
1   3   8    9    6   3
3   5   16   20   9   3
5   6   10   13   8   4
4   4   1    2    4   3
1   1   0    1    2   1
```

IMAGE CORRELATION PROCESSING BY ADDITION OF REAGGREGATION

CROSS REFERENCE TO RELATED APPLICATIONS

This application claims priority to European Patent Application No. 22181600.2, filed on Jun. 28, 2022, the entire contents of which are incorporated herein by reference.

TECHNICAL FIELD

The present invention relates to an image correlation processing method to be used in connection with optical mice for instance. The method uses a reaggregation process to improve image correlation processing as explained later in more detail. The invention also relates to an apparatus configured to carry out the method.

BACKGROUND OF THE INVENTION

An optical mouse is a computer mouse which uses a light source, typically a light-emitting diode (LED), and a light detector, such as an array of photodiodes, to detect movement of the mouse relative to a surface. Variations of the optical mouse have largely replaced older mechanical mice, which rely on moving parts to sense motion.

In operation, the optical mouse takes a picture of the surface it sits upon, and then after moving slightly, it takes another picture. The two pictures or images should overlap, and the images are compared to determine what offset is needed to align the common surface patterns in both pictures. That offset is reported to the host computer as the measured movement. The mouse moves again, takes a new picture, compares it to the previous picture, and another displacement report is generated. This repeats hundreds or thousands of times per second and the motion between image frames is measured in tens of micrometers. Thus, there is benefit to improving the efficiency and accuracy of this process, as it occurs frequently and errors may accumulate rapidly.

In view of the above, computer optical mice determine their motion through displacement measured by aligning overlapping image frames on an array of pixels. Due to spatial quantization limits this displacement takes the form of an integer macropixel calculation based on the general alignment of common features, and a subpixel displacement calculation based on the relative quantized displacement between features. The interpolated subpixel displacement is much noisier, and it is also more prone to bias and distortion. Both of these calculation methods hold flaws that can result in inaccurate or distorted results for both the macropixel and subpixel calculations which make up the total displacement.

Macropixel:

Referring to FIGS. 1a to 1e, in the quantized system, subpixel displacement will cause some common surface features 1 present in one image 3 to shift in the direction of motion relative to other features in the next image 3. As illustrated, the images are placed on an array of pixels 5, where the pixels with a reduced amount of reflected light are highlighted (see FIGS. 1b and 1d showing the digitized version of the images shown in FIGS. 1a and 1c, respectively). The proportion of features that shift along one or both axes (horizontal and vertical) gives a statistical indication of the subpixel displacement. In the worst-case scenario of a subpixel motion of 0.5 pixels along both axes, it is statistically expected that one quarter of the common features will shift horizontally, one quarter will shift vertically, and one quarter will shift diagonally. In this instance, the cross-correlation result as shown in FIG. 1e, calculated between two consecutive image frames will no longer have a strong distinct peak at the appropriate displacement with a magnitude equal to the number of common features, but a disaggregated 2×2 plateau centered around the true peak with the largest maximum having as little as a quarter of the true peak's magnitude.

This spreading of the peak into a 2×2 array of lower-magnitude correlations makes the macro-pixel selection process much more vulnerable to competing peaks in the cross-correlation that come about due to coincidental alignment of aliased feature patterns or noise. An incorrect global peak being chosen can have significantly detrimental effects on tracking.

Subpixel:

The subpixel displacement is determined by the relative distribution of features that make up the 2×2 area that surrounds the 'true' hypothetical peak. The statistical expectation is a linear distribution, and thus a linear center of mass calculation on the 2×2 array of values would be ideal. However, features that spread over multiple pixels will lead to arbitrary offsets added to the values surrounding the peak value due to their adjacent nature, in addition to any shifted correlating features. These offsets can be significant and generally renders a direct center of mass calculation unreliable. Instead, a two-dimensional (2D) paraboloid fit on a 3×3 array of values centered on the global peak pixel may be used, and the location of the peak of the fitted parabola is interpreted as the location of the 'true' peak.

The paraboloid fit is more robust and reliable due to some offset-correcting properties inherent in the calculation. This also negates the need to appropriately select which 2×2 section containing the global maximum to calculate on, as the 3×3 is centered on the global maximum. However, because the true distribution of features is linear, the quadratic fitting introduces a distortion that biases subpixel calculations towards the center value. This distortion is symmetric and thus will statistically cancel itself out over multiple measurements if the subpixel values are uniformly measured across the distribution. However, when the subpixel component of motion is not uniformly distributed, such as while tracking at low speeds or at shallow angles, this distortion will accumulate errors. An evident sign of this distortion is error in trajectory near shallow angles and the 'squaring' of circular motion.

These outlined issues with macropixel and subpixel calculations described above produce noticeable effects on the tracking reliability and quality. Thus, an efficient method of compensation or correction to these issues is desirable.

The document US 2014/210725 A1 describes an optical navigation apparatus and an optical navigation method. The apparatus includes a light source unit, an image sensing unit, and a processing unit, which is electrically connected to the light source unit and the image sensing unit. The light source unit provides a beam of light. The image sensing unit captures a first image at a first time instant when the light is projected onto a reflection surface. The processing unit calculates an image quality index of the first image and determines a matching block size between the first image and a second image according to the image quality index.

The document US 2008/246725 A1 describes an apparatus for controlling the position of a screen pointer, which includes an at least partially coherent light source for illuminating an imaging surface, by generating reflected images. The apparatus includes a navigation sensor for generating digital images based on the reflected images, performing a movement computation based on the digital images, generating movement data based on the movement computation that is indicative of relative motion between the imaging surface and the apparatus, wherein the movement computation has a low sensitivity to effects in the digital images caused by particle contamination.

SUMMARY OF THE INVENTION

An object of the present invention is to overcome at least some of the above shortcomings relating to a computer-implemented method of image correlation processing, for instance in the context of optical mouse tracking.

According to a first aspect of the invention, there is provided a computer-implemented method of image correlation as recited in claim 1.

The proposed method when applied to optical mice fixes some significant issues inherent in the current mouse tracking implementations without requiring alteration or modification of the current algorithm. This produces more reliable and more accurate tracking, while permitting the continued use of current firmware code and any hardware-accelerated components of the algorithm implementation.

The macropixel calculation issue of a disaggregated true peak competing with other locations of coincidental correlation is significantly reduced. The reaggregation step of the present invention reassembles the distributed values that constitute the 'true' peak. This step will also combine coincidental peaks with their neighbors to increase their value as well, but the true peak holds a significant statistical advantage, resulting in a net reduction in the number of comparisons that will select the incorrect macro displacement between images.

The subpixel calculation issue of a distorted calculation is rectified by the reaggregation step pre-distorting the distribution of values surrounding the peak. The distortion caused by the quadratic fitting of the linear data is directly cancelled out, resulting in the equivalent of an undistorted center of mass calculation which maintains the inherent offset-correction of the quadratic fitting.

According to a second aspect of the invention, there is provided a non-transitory computer program product comprising instructions for implementing the steps of the method according to the first aspect when loaded and run on computing means of a computing device.

According to a third aspect of the invention, there is provided an image processing apparatus as recited in claim 15.

Other aspects of the invention are recited in the dependent claims attached hereto.

BRIEF DESCRIPTION OF THE DRAWINGS

Other features and advantages of the invention will become apparent from the following description of a non-limiting example embodiment, with reference to the appended drawings, in which.

4

Figure 1A:
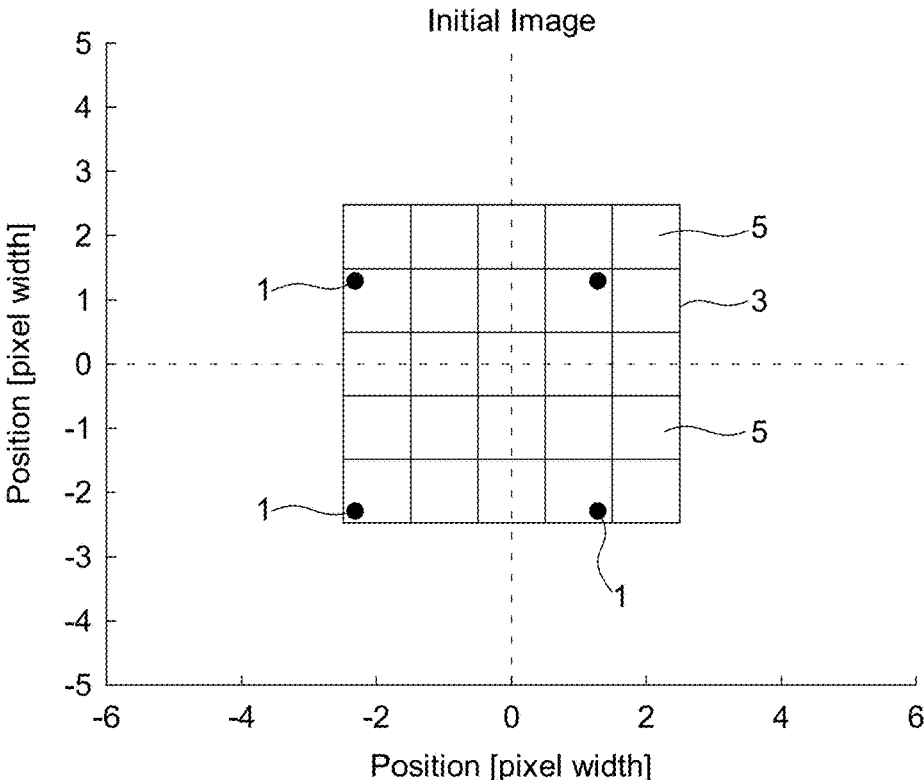
FIGS. 1a to 1e show two consecutive images on a pixel array, their digitized versions and a cross-correlation result illustrating the macropixel calculation problem according to an existing image correlation processing method.
Figure 1B:
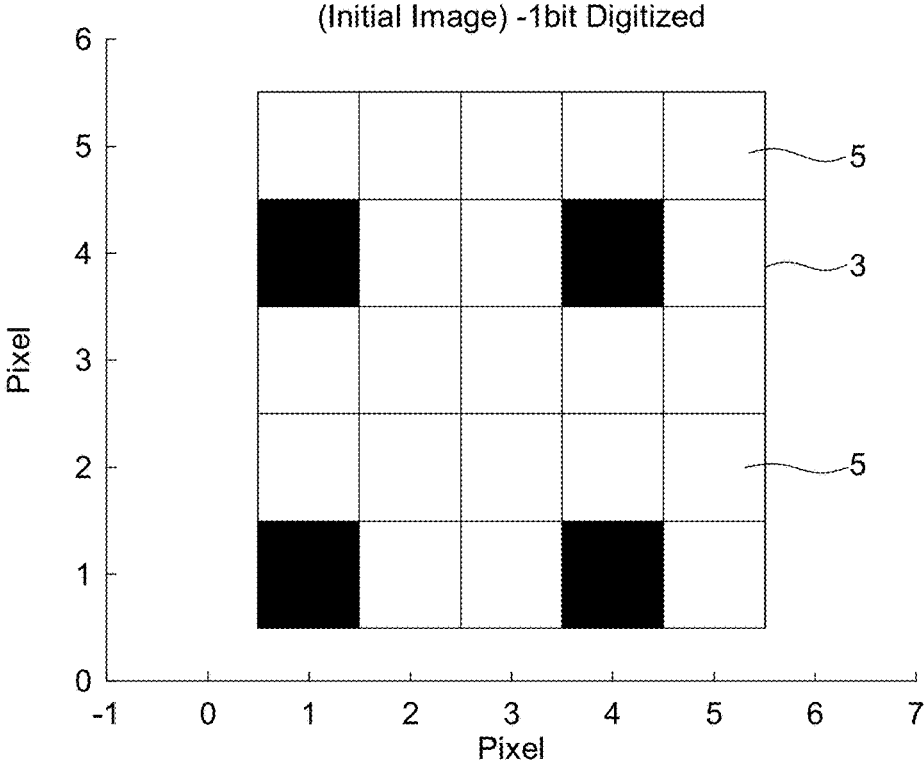
Figure 1C:
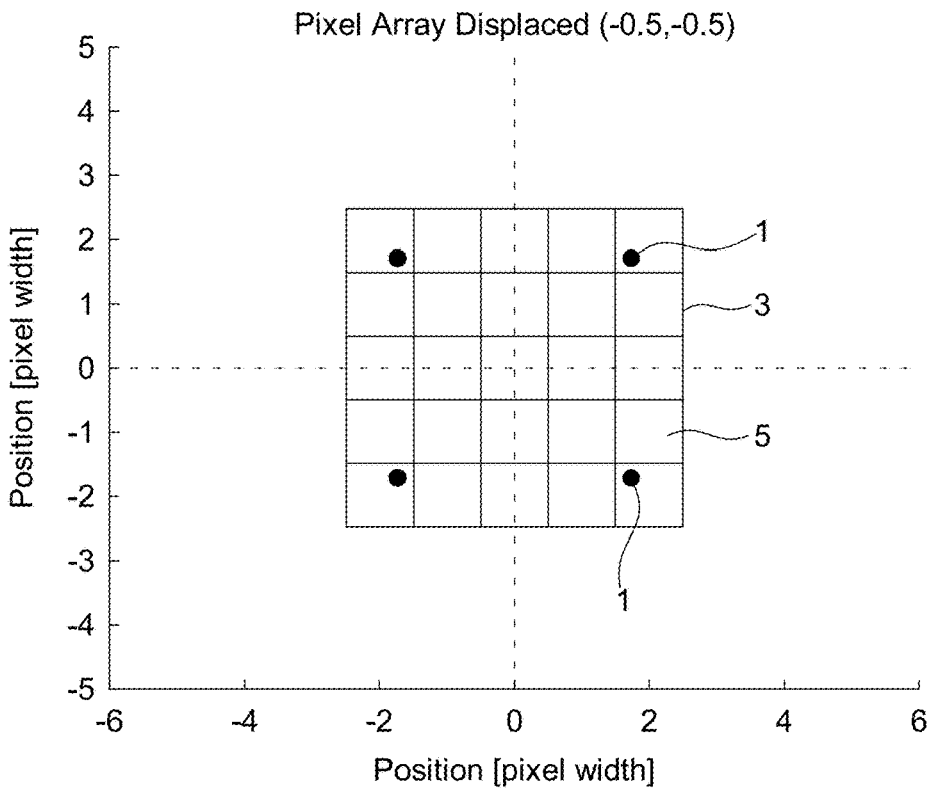
Figure 1D:
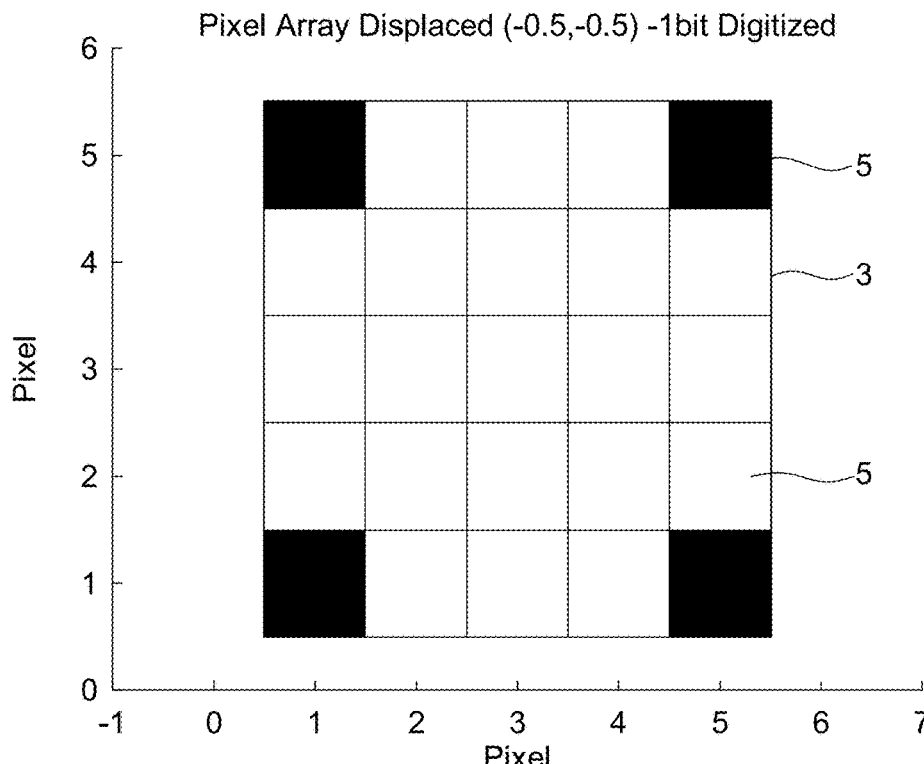
Figure 2:
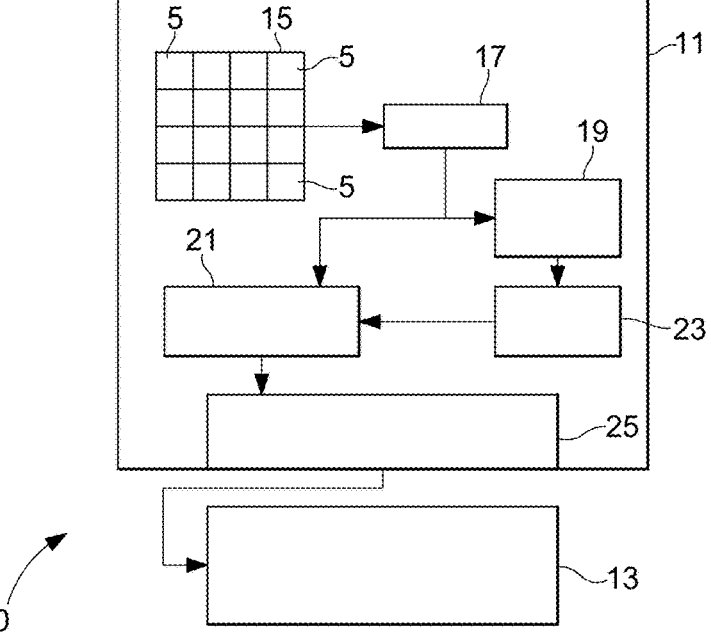
Figure 4:
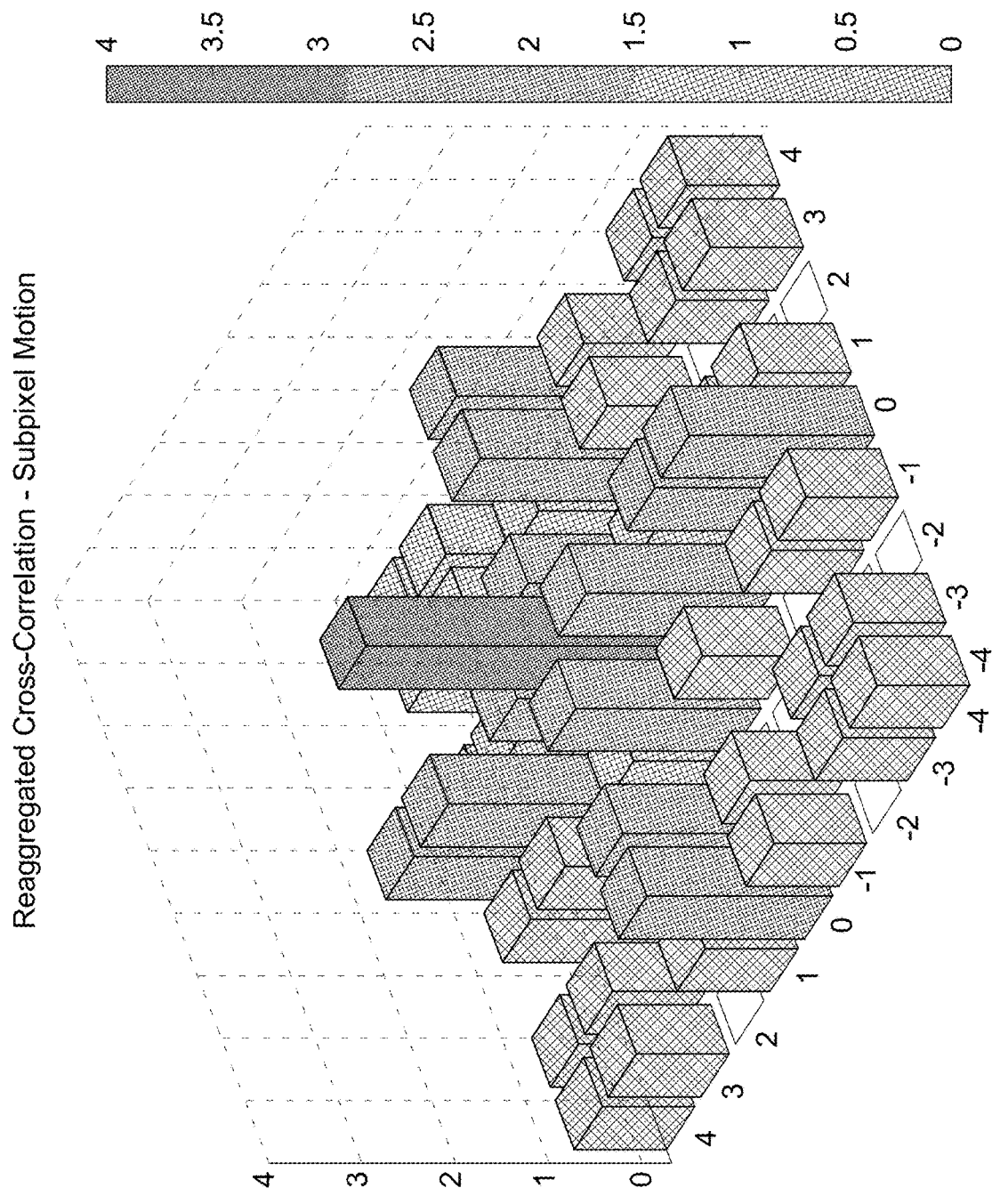
Figure 5:
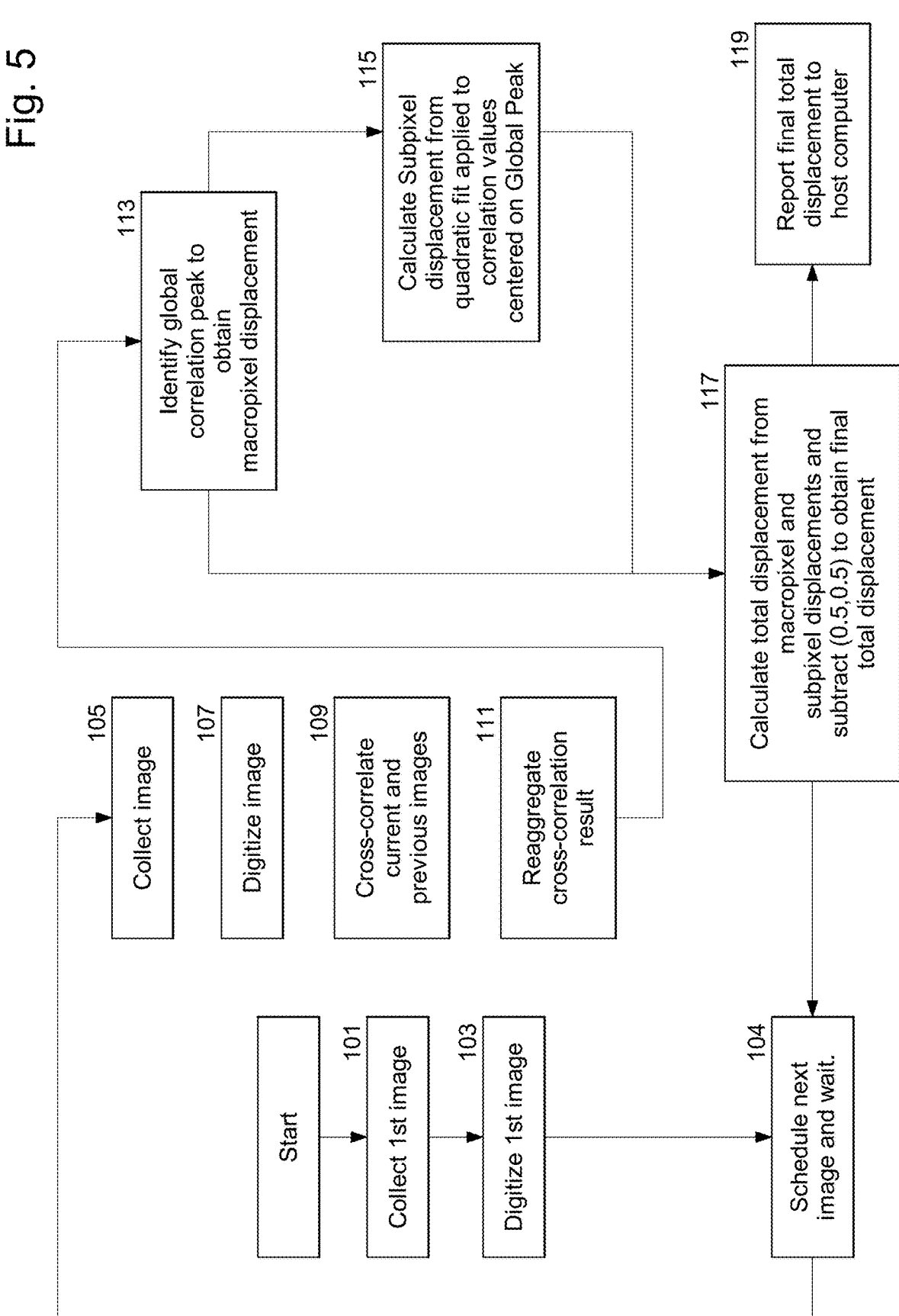
Figure 6:
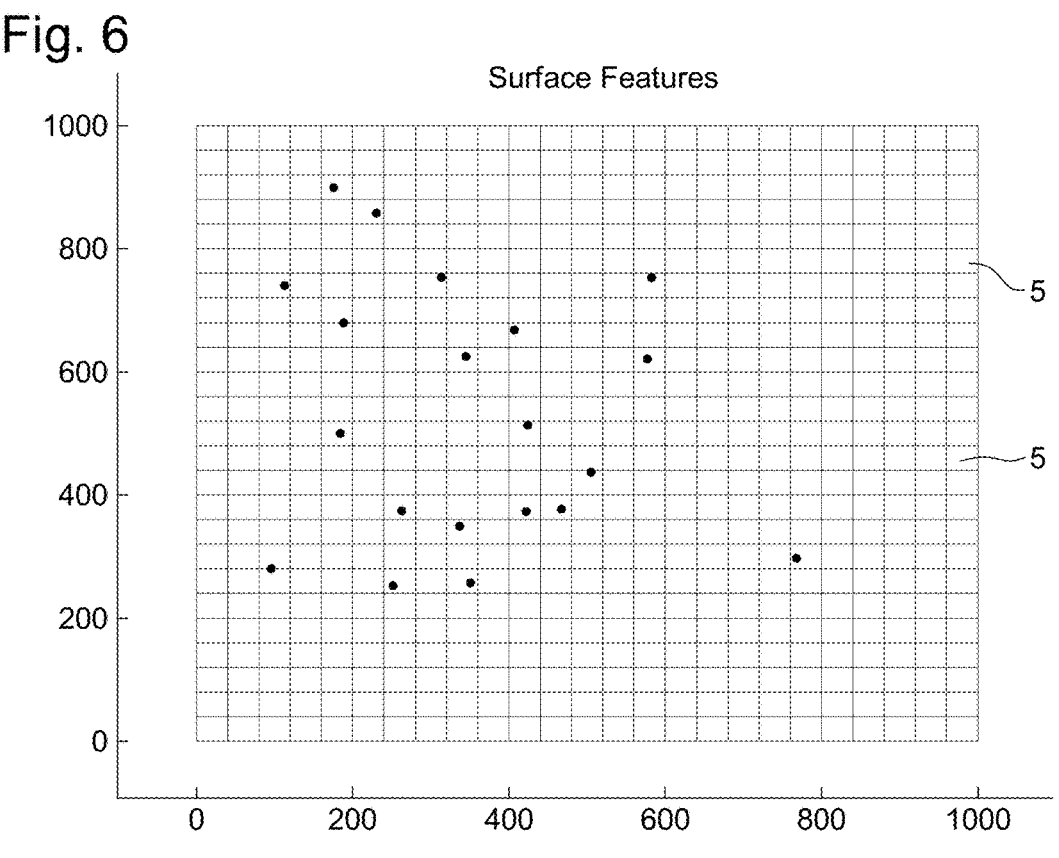
Figure 7:
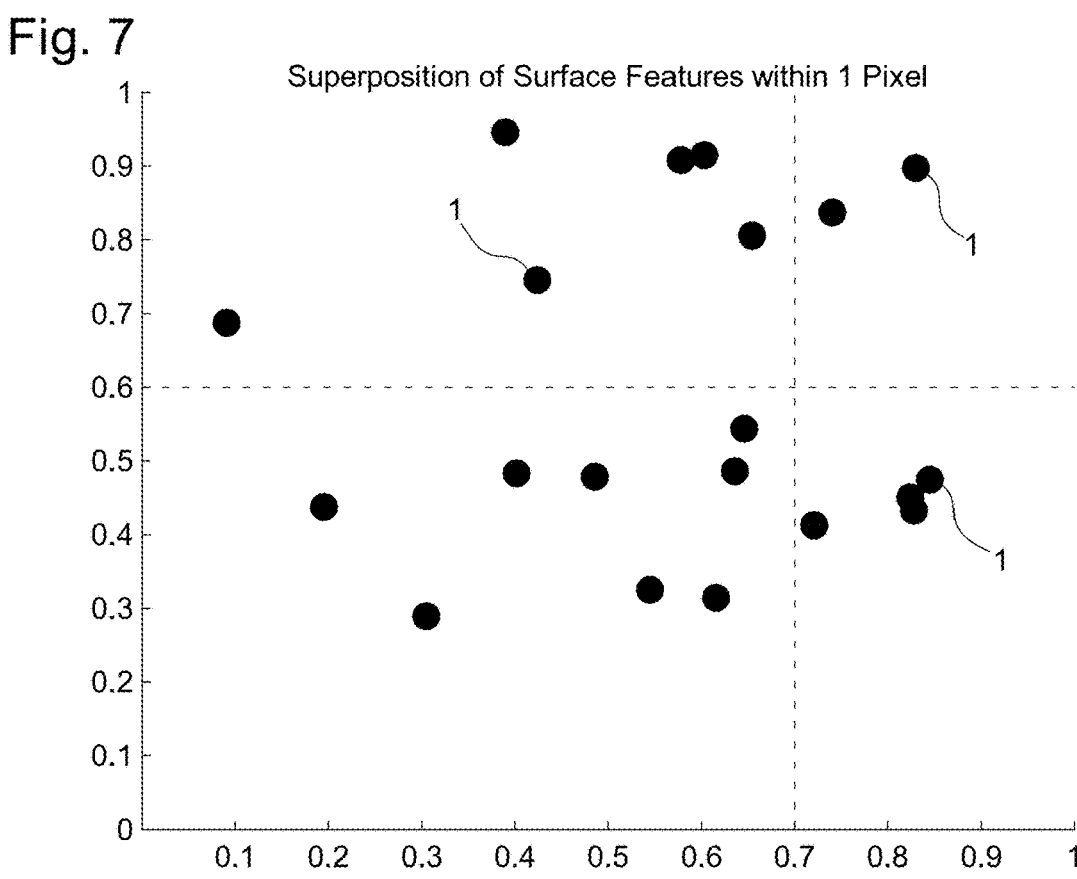
Figure 8:
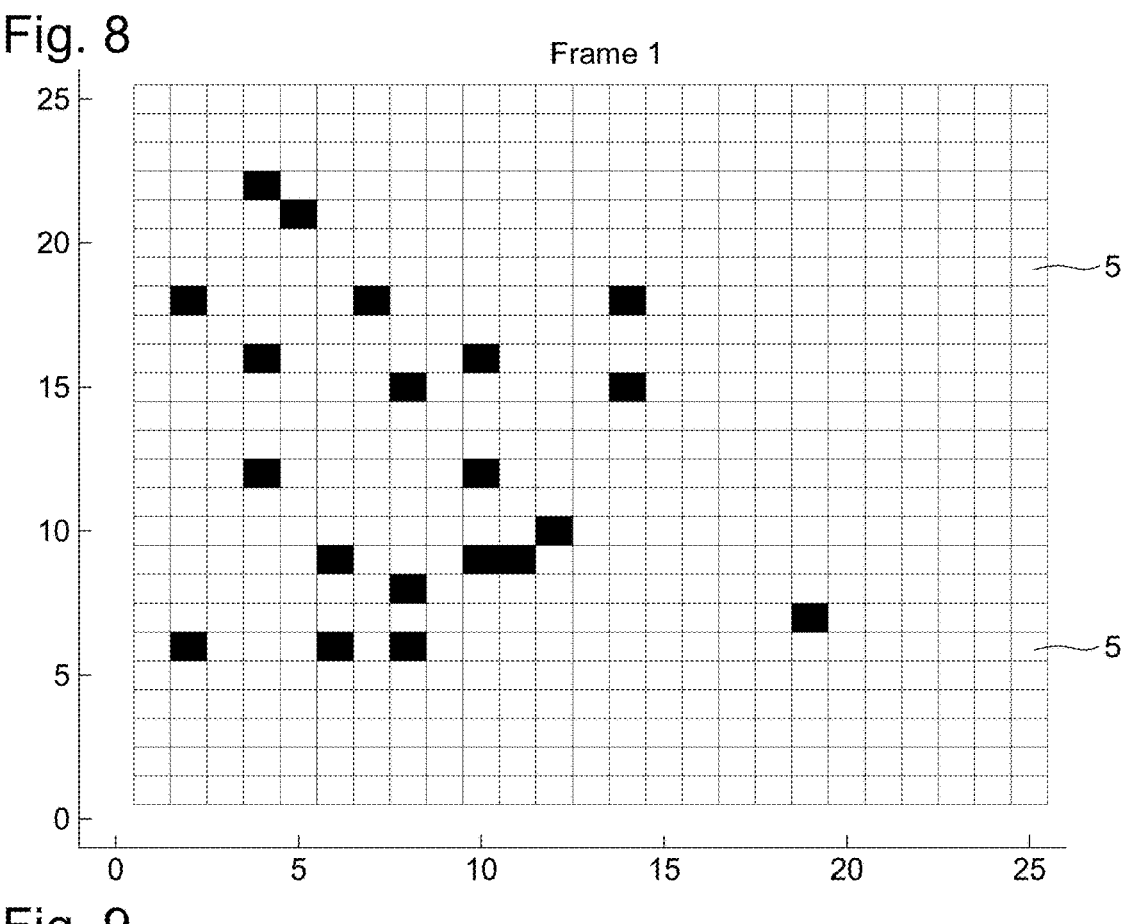
Figure 9:
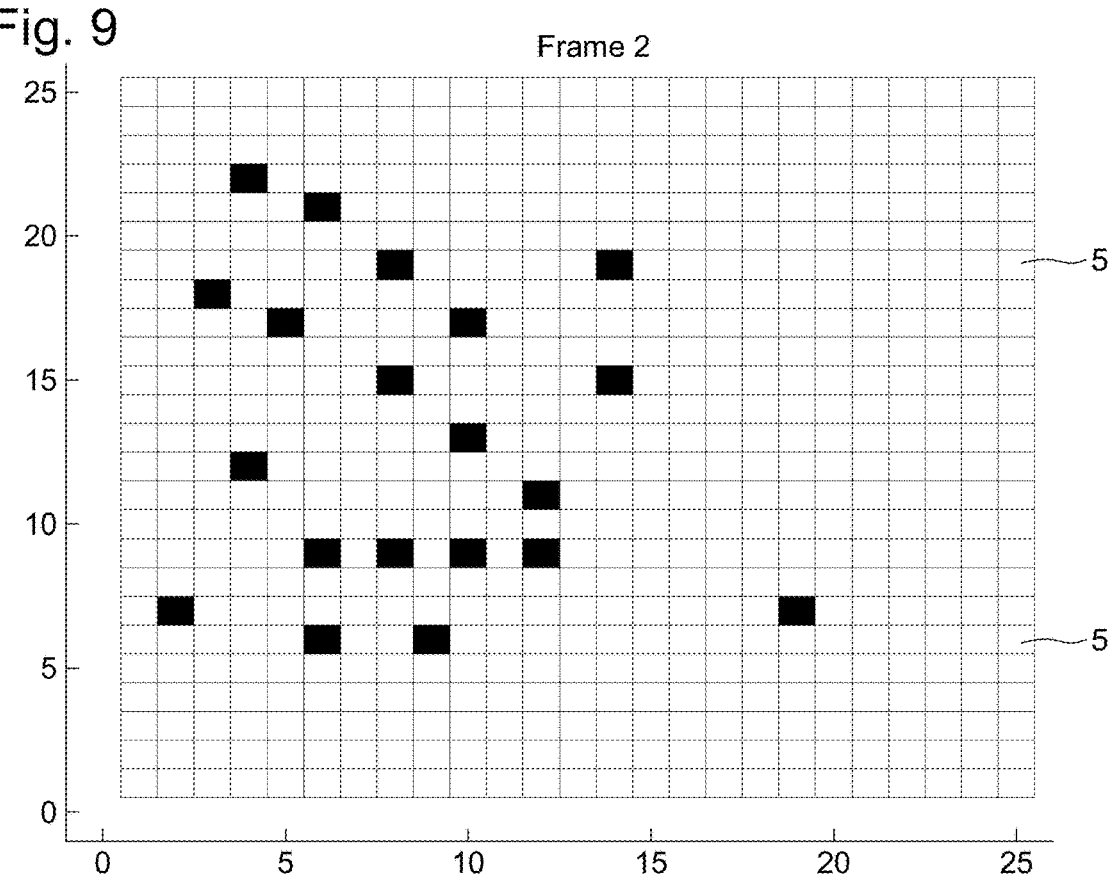
Figures 10, 11:
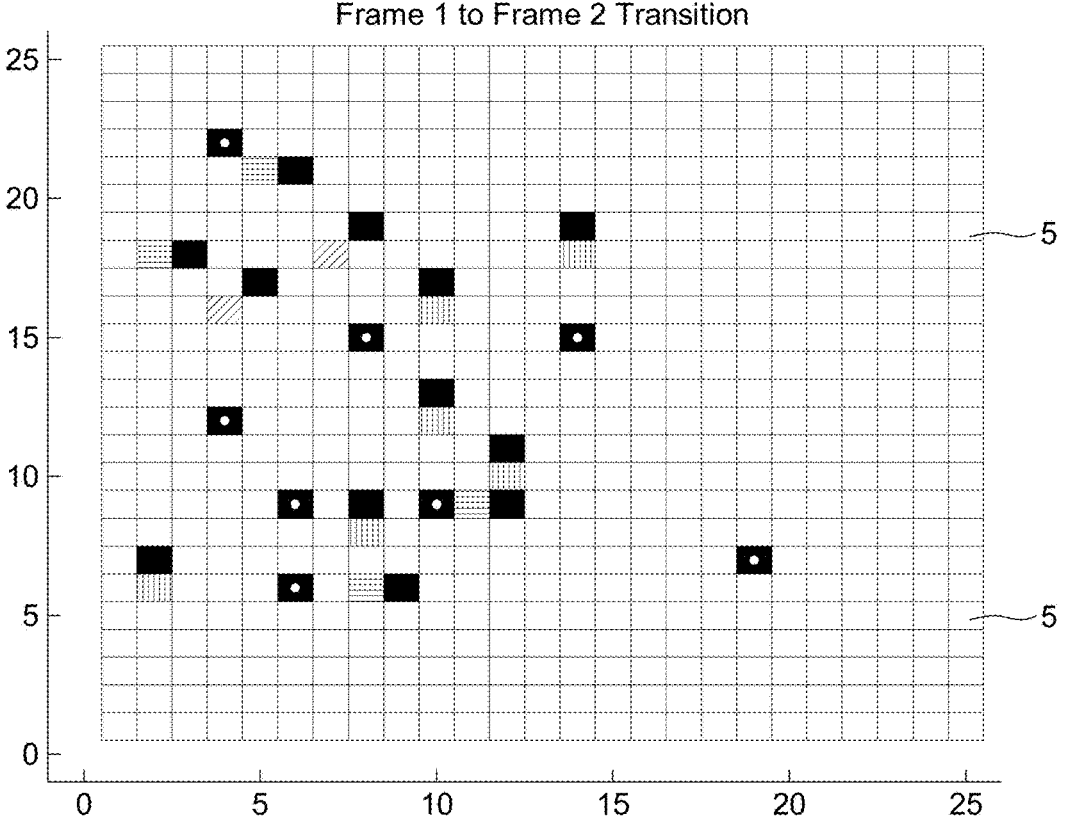
Figure 12:
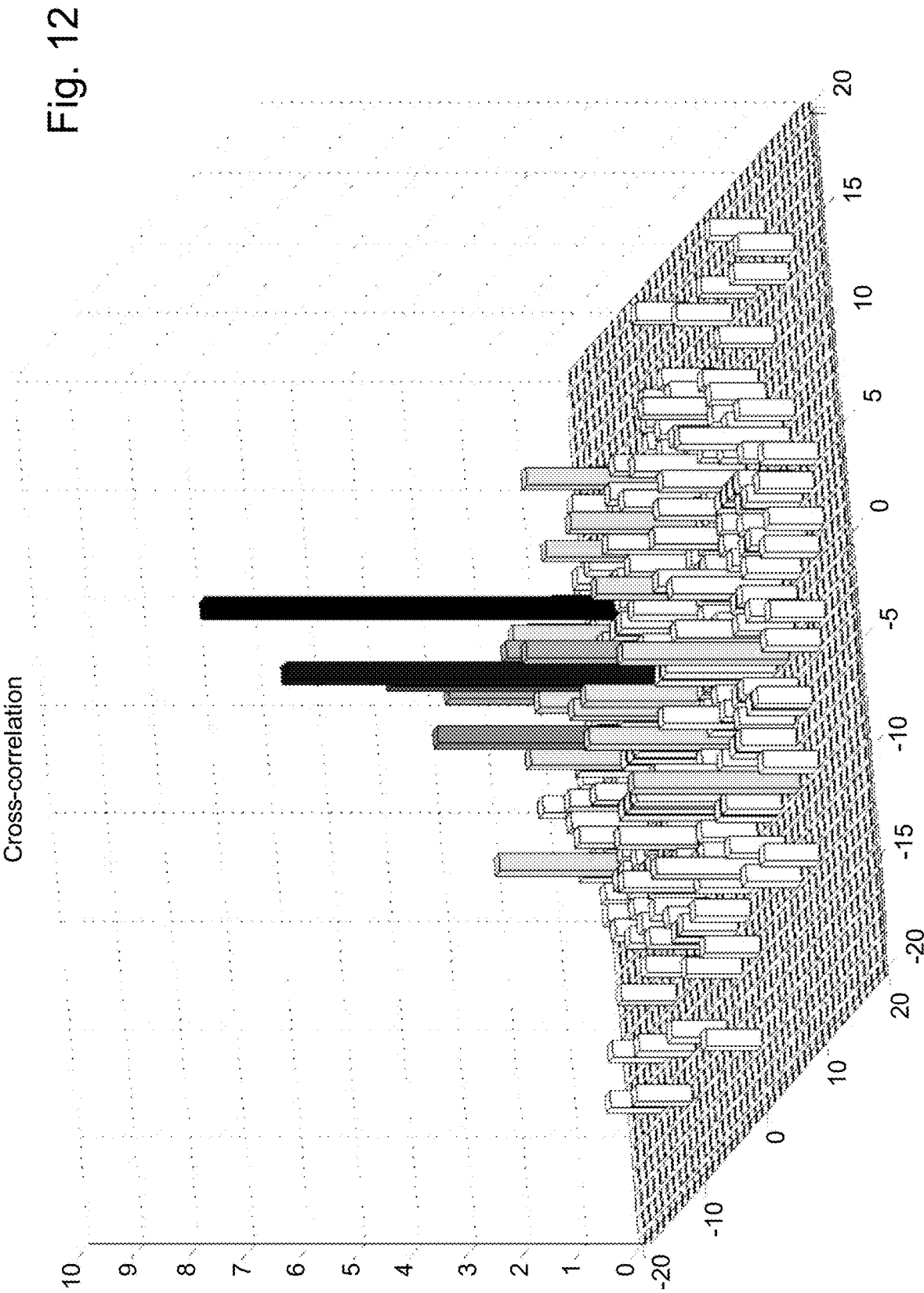
Figures 13, 14, 16:
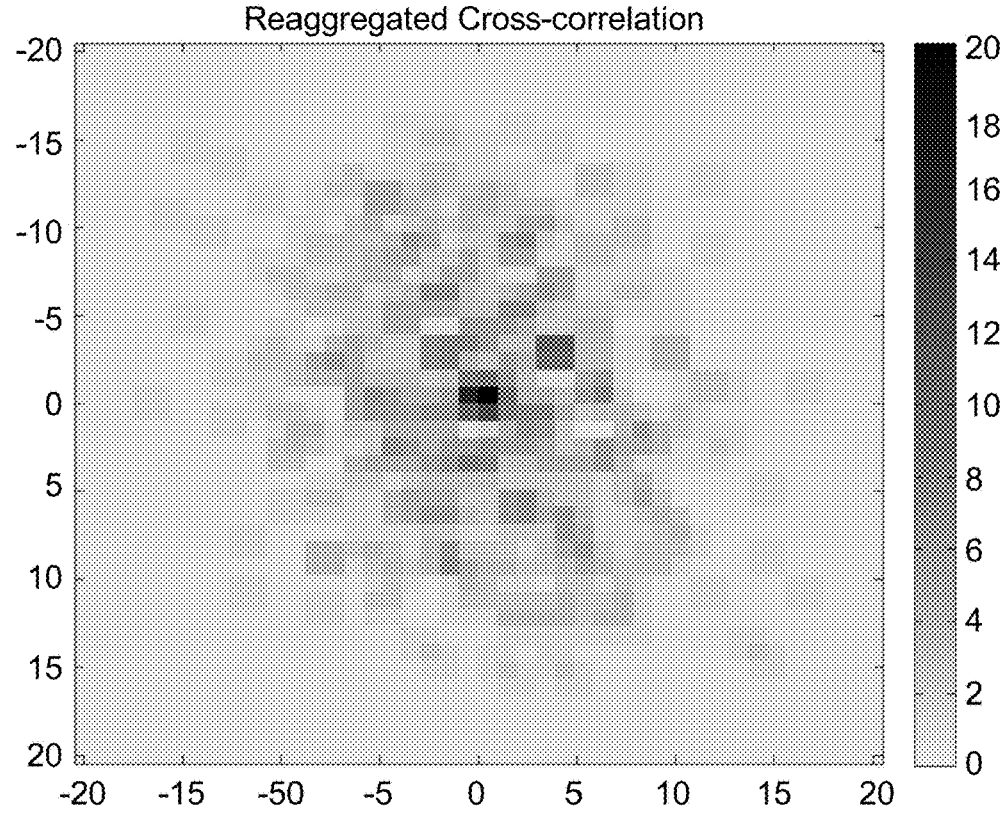
Figure 15:
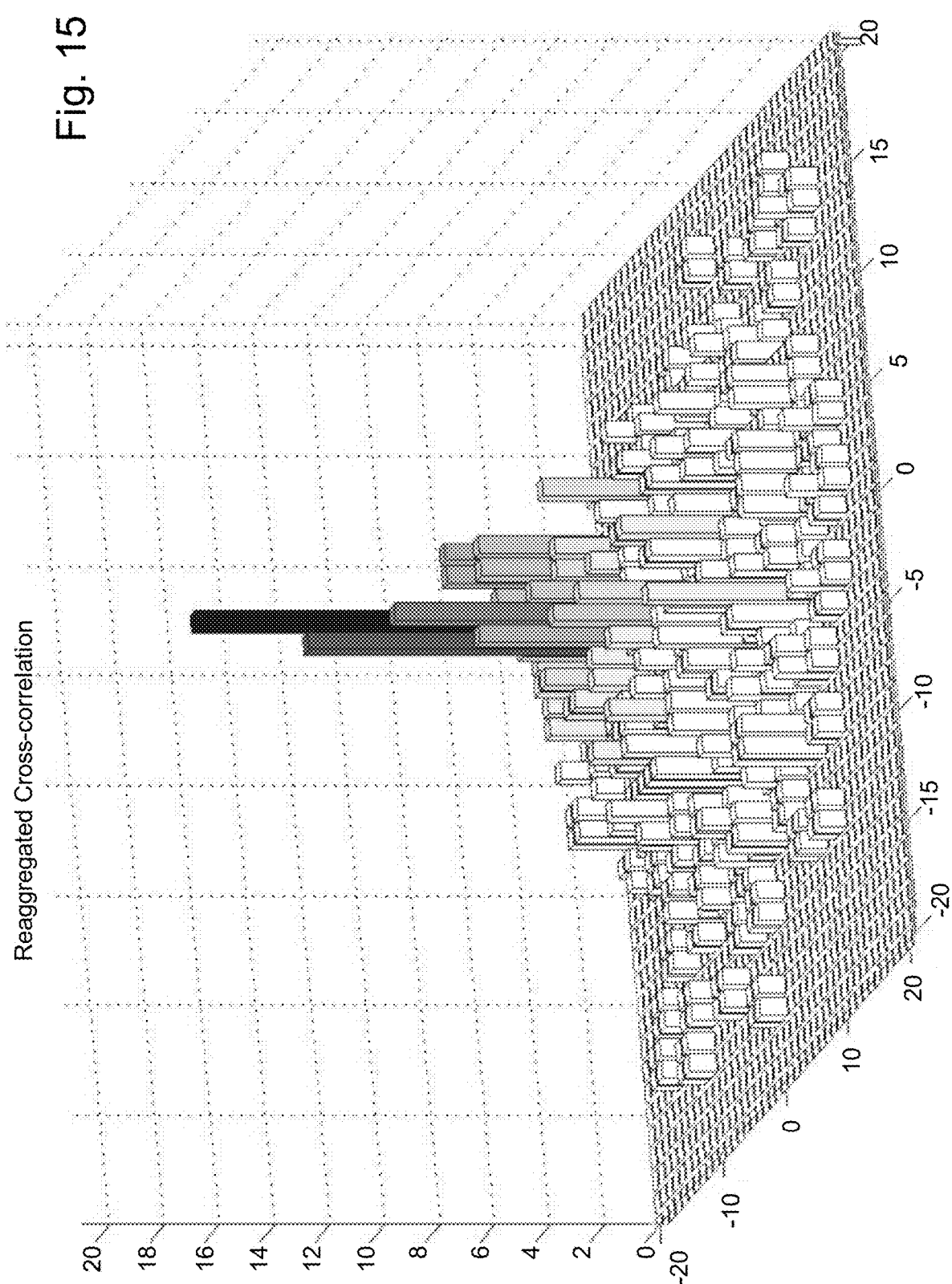

FIG. 2 shows a block diagram schematically illustrating some functional elements of a computer mouse system, which may be used to implement the teachings of the present invention;

FIGS. 3a to 3e show two consecutive images on a pixel array, their digitized versions and a cross-correlation result illustrating the process of performing cross-correlation in an integer pixel displacement scenario;

FIG. 4 shows a cross-correlation result obtained for the two image frames shown in FIGS. 1b and 1d when the reaggregation step according to the present invention has been applied;

FIG. 5 is a flow chart summarizing the method steps of an example image correlation processing method according to the present invention;

FIG. 6 shows a pixel array sitting atop an example image (referred to as image 1) with 20 distinct surface features;

FIG. 7 shows the position of all the 20 surface features within their pixels superimposed together;

FIG. 8 shows a 1-bit digitized version of image 1 of FIG. 6 forming frame 1;

FIG. 9 shows a 1-bit digitized version of image 2 forming frame 2, which is generated from image 1 of FIG. 6, but with the pixel array shifted left by 0.3 pixels and down by 0.4 pixels;

FIG. 10 demonstrates how the features shifted between frame 1 and frame 2 of FIGS. 8 and 9, respectively;

FIG. 11 shows the cross-correlation result of frame 1 and frame 2;

FIG. 12 shows the cross-correlation result of FIG. 11 as a three-dimensional (3D) bar chart;

FIG. 13 shows the values of the cross-correlation of FIG. 11 centered at (0,0);

FIG. 14 shows an aggregated cross-correlation result of frame 1 and frame 2 once the reaggregation step has been applied to the cross-correlation result of FIG. 11;

FIG. 15 shows the aggregated cross-correlation result of FIG. 14 as a 3D bar chart; and FIG. 16 shows the values of the reaggregated cross-correlation result of FIG. 14 centered on the value 20 at (0.5,0.5).

DETAILED DESCRIPTION OF THE INVENTION

An embodiment of the present invention will now be described in detail with reference to the attached figures. The invention will be described in the context of an image correlation processing method to be used for tracking an optical computer mouse. However, the teachings of the invention are not limited to this environment or application. Identical or corresponding functional and structural elements which appear in different drawings are assigned the same reference numerals. As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." Furthermore, the term "comprise" is used herein as an open-ended term. This means that the object encompasses all the elements listed, but may also include additional, unnamed elements. Thus, the word "comprise" is interpreted by the broader meaning "include", "contain" or "comprehend".

Before explaining the proposed method of the present invention in more detail, some definitions are first given in the following:

A pixel is a photo-sensitive [square] area which records a single analog voltage based on light collected during a period of time.

An image is a two-dimensional (2D) array of analog pixel values collected and digitized to obtain an image frame. An image also implies a new measurement of displacement calculated between it and the previously collected image, and a corresponding displacement report sent to the host.

Surface features are any area of the tracking surface which reflects an amount of light different than the average of the surface into the corresponding pixel. This includes areas of different color or reflectivity, as well as physically non-flat areas which reflect incoming light away from the pixel it falls under. It is more common for a surface feature to reduce incoming light than to increase it, though both are possible. For this reason, it is common when digitizing the analog value that lower analog values are assigned larger digital values, indicating more significant features from a greater reduction in light seen by a given pixel.

An analog-to-digital converter (ADC) is an electronics hardware component that converts an analog value (e.g., a voltage value) into a digital value with a limited bit depth. The principles in this description generalize to arbitrary ADC bit depth, but examples of 1-bit ADC data will be used for simplicity, where values of 0 represent accumulated pixel voltages close to the average light reflected by the surface, and values of 1 represent significant reductions in light seen by a minority of pixels.

A host (or host computer) is the computer or other device the peripheral mouse is plugged into. The host is presumed to expect differential measurements, i.e., the displacement between the mouse's current position and its position at the time of its previous report. The host will add this reported measurement directly to a mouse pointer position to produce a new position. The pointer position of the host should, at any given time, be at its initial location plus the cumulative sum of all displacement reports sent by the mouse. This value may be scaled by an arbitrary value, and this ignores the impact of the pointer pressing against any screen boundaries.

Displacement is the distance moved between two images being compared.

A displacement report is the final measurement reported to the host computer, measured in pixels, between two compared images. This measurement is the sum of macropixel and subpixel calculations.

Cross-correlation is a standard signal processing tool which produces a multidimensional array (also referred to as a cross-correlation result) of correlation values. This is done by evaluating how well the two signals (or image frames in the present invention) correlate at a specific offset, and then repeating that calculation for every possible offset (within some window of interest). Each calculation produces a correlation value, and this collection of values and corresponding offsets are plotted against each other. The global maximum of this array of correlation values indicates that the greatest correlation is found with that specific offset. Thus, each correlation value in the array indicates how well two matrices (such as image frames) match when one is offset by an amount corresponding to the coordinates of the correlation value in the array. The correlation value at (0,0) represents the correlation when both images are aligned with no offset. The correlation value at (−2,7) represents the correlation when the first image is shifted horizontally by −2 pixels and vertically by +7 pixels. Large correlation values produced by repetitive or coincidental patterns in the input images may occur, though these are generally lower in value than the correlation value produced by true alignment of common features from a large overlapping field of view.

Macropixel displacement refers to the (x,y) displacement measured between two images to the nearest integer-pixel value. This value is equal to the offset between the two compared images. This offset is generally determined by the coordinates of the global peak identified in the cross-correlation result. In a simplified example where the image is digitized by a 1-bit ADC, with digital features assigned a value of 1, the peak value is expected to be equal to the number of features present in the overlapping field of view seen by both images. Subpixel motion can distribute this expected correlation value into adjacent offset values, which can reduce the prominence of the peak at the location of true alignment and can make it more difficult to identify against large coincidental peaks in other parts of the cross-correlation result. The method expressed in the present invention seeks to help correct this issue.

Subpixel displacement refers to the fractional (x,y) component of the displacement measured relative to the macropixel displacement. Subpixel values range only from −0.5 to +0.5 in both dimensions. Presence of non-zero subpixel displacement is statistically expected to impact the cross-correlation values near the macropixel displacement location in a particular way. The correlation values surrounding the macropixel displacement can be analyzed for this impact to estimate the likely subpixel displacement which occurred. If a mouse's image sensor consists of an array of pixels, each a 25 μm square, then a horizontal motion of 105 μm would constitute a motion of 4.20 pixels. The macropixel component of that would be 4 pixels. The subpixel component would be 0.20 pixels. These are separated because they are calculated separately. In this example, we would expect to see a global correlation peak at the (4, 0) xy coordinate of the cross-correlation result. The non-zero subpixel motion is expected (though not guaranteed) to cause a particular form of distortion to the values seen in the cross-correlation around the global peak. By analyzing the values around the selected peak, it is possible to estimate what subpixel motion likely occurred.

Reaggregation refers to the method expressed in the present invention. Reaggregation is the 2D convolution of a cross-correlation result with a 1×2, 2×1, or 2×2 array of 1's. This filtering step adds together every 2×2 (or 1×2, or 2×1) grouping in the cross-correlation to produce a new array of values. Each element of this new array is considered to be centered on the half-pixel offsets between the constituent 2×2 array of values which were summed to produce each element. The expectation is that wherever the peak corresponding to the displacement between the images ought to be, if its total value has been spread into adjacent correlation elements by subpixel motion, this filtering step will reconstruct it to its full height, making it easier to identify against coincidental peaks that appear elsewhere in the cross-correlation.

The present invention is next explained in more detail with reference to the figures. FIG. 2 shows a simplified block diagram of a system 10 configured to implement the method of the present invention. The system comprises a computer mouse 11 which is operatively connected to a host computer 13. The connection may be a wired connection or a wireless connection depending on the implementation. Different connection examples that may be used are PS/2, universal serial bus (USB) or Bluetooth. The mouse 11 comprises an image sensor having an array 15 of photosensitive pixels 5, which is operatively connected to an ADC 17, which is configured to digitize the images collected by the mouse. The ADC is operatively connected to a memory unit 19 configured to store the digitized images received from the ADC 17. The ADC is further operatively connected to a processor 21, which is for example configured to carry out cross-correlation operations and implement the reaggregation process. A delay unit 23 is arranged between the processor 21 and the memory 19. More specifically, in this example, the delay unit is a 1-sample delay unit configured to feed image frame N−1 to the processor, while the ADC 17 is configured to feed image frame N to the processor, where frame N is the current or most recent image frame, while frame N−1 is the immediately previous image frame to frame N. The processor 21 is further configured to send a displacement report to an input/output unit which operates as an interface between the mouse 11 and the host computer 13.

In operation, the mouse 11 works by illuminating a surface, collecting an image with the array 15 of photosensitive pixels 5, and digitizes the result into an image frame. After moving slightly, a new image is collected with an overlapping field of view. The displacement between the two images is determined by aligning the common features. This displacement is reported to the host computer 13 as movement. In the present invention, this comparison takes the form of cross-correlation, which generates correlation coefficients for the two images across all combinations of valid offsets. The cross-correlation result is expected to have a global peak at the offset corresponding to the displacement.

Due to the quantization in the system, displacements of non-integer pixel dimensions will generally cause a linearly proportional number of surface features to shift what pixel they fall under relative to the overall feature pattern seen in the previous digitized frame. This is both beneficial and detrimental. It is beneficial in that motion of less than a pixel still provides a statistical signal that allows estimation of the subpixel (non-integer) component of displacement. It is detrimental in that a strong correlation peak, which should roughly have a value equal to the sum of digital values in the overlapping area, will be distributed into adjacent pixels. The peak being distributed into a 2×2 array of values can reduce the peak value down to as little of a quarter of the expected magnitude, making it more difficult to identify as the most likely integer-displacement in the cross correlation. The reaggregation process helps make the correct peak corresponding to the correct displacement more apparent and less ambiguous due to diminished values from subpixel motion.

Figure 3A:
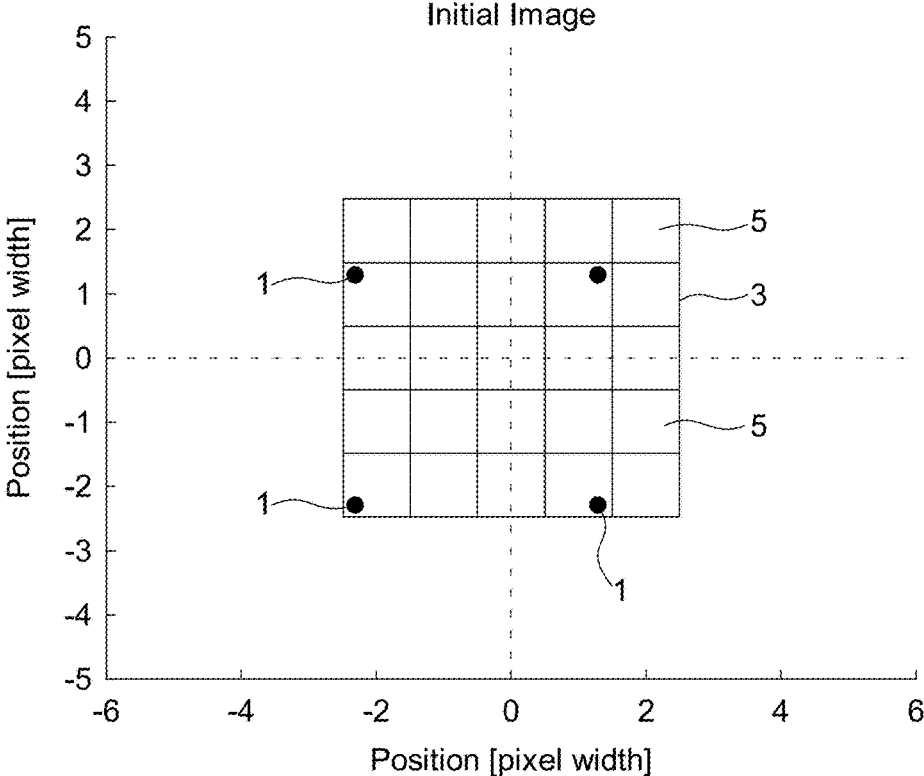
Figure 3B:
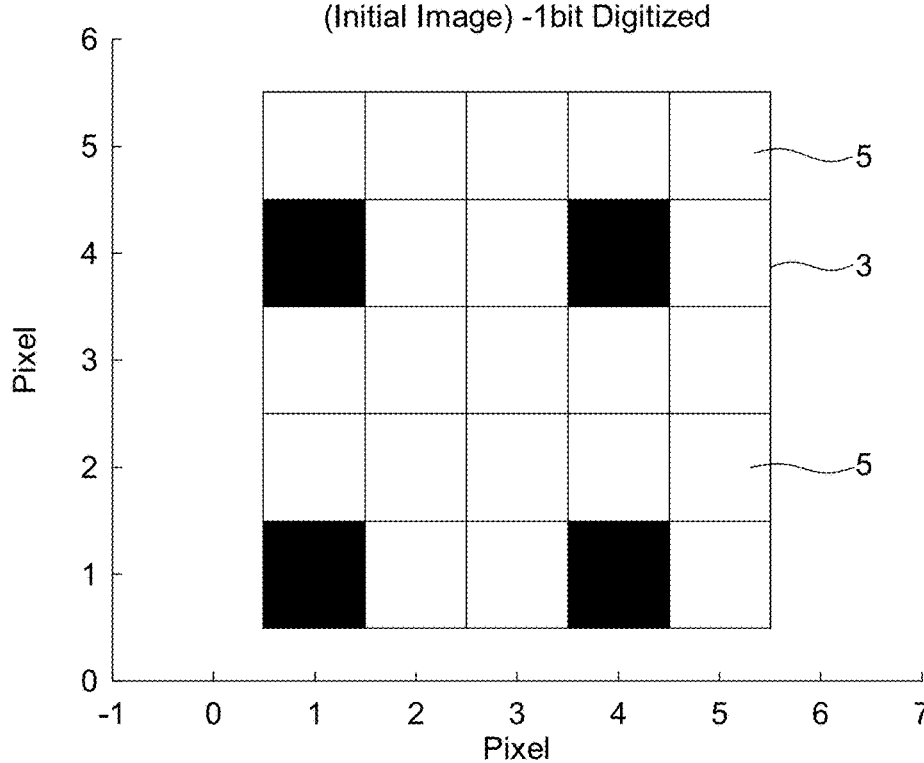
Figure 3C:
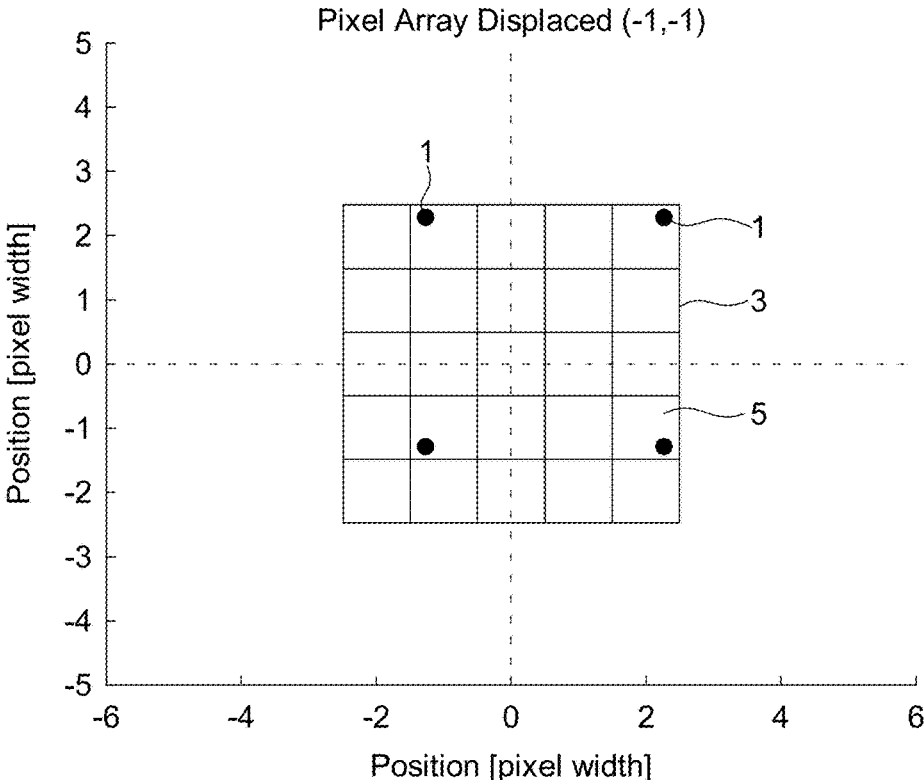
Figure 3D:
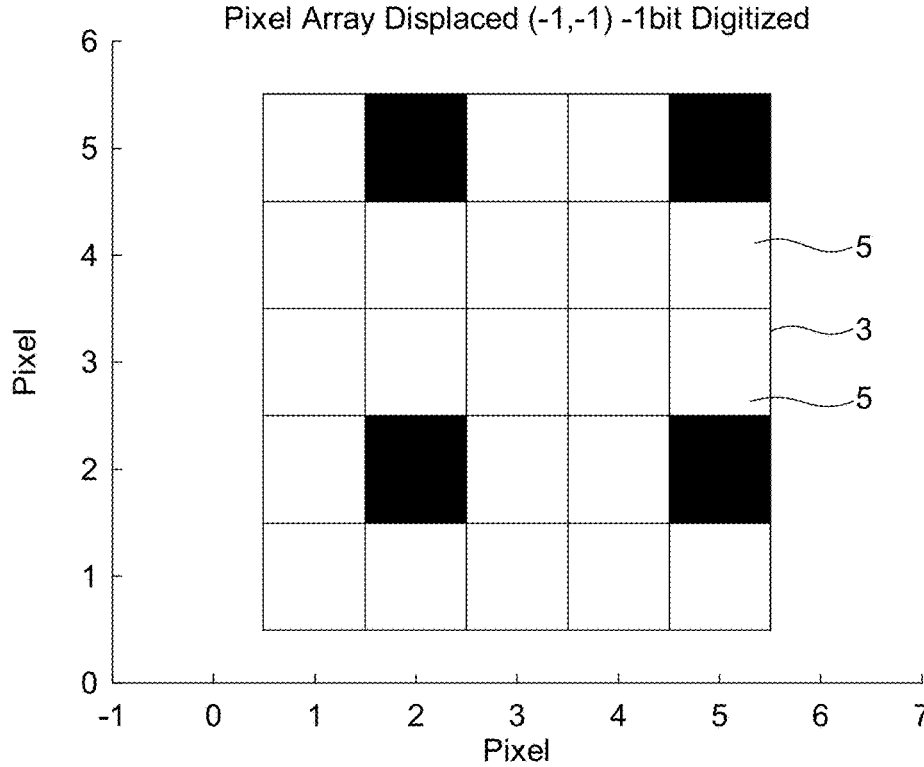
Figure 3E:
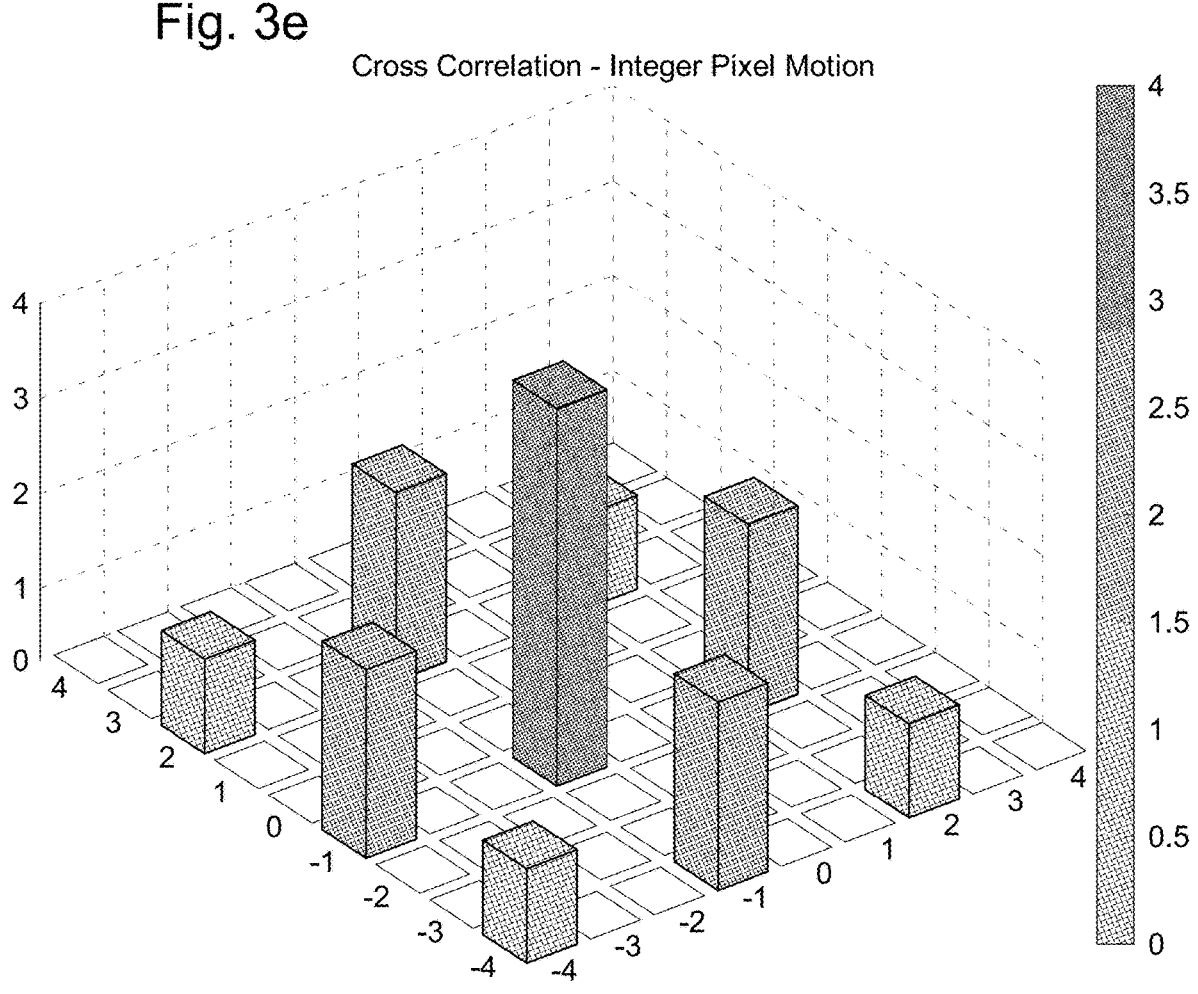

FIGS. 3*a* to 3*e* illustrate how a cross-correlation map or result is obtained for an ideal case, where a second image 3 as shown in FIG. 3*c* has been moved to the right by one pixel, and up by one pixel with respect to a first image 3 shown in FIG. 3*a*. This means that that the mouse has moved to the left by a distance corresponding to the dimension of one pixel, and down by a distance corresponding to the dimension of one pixel. The digitized versions of the first and second images are shown in FIGS. 3*b* and 3*d*, respectively. As can be seen, in this example, each image includes four distinct surface features 1 lying within a given pixel area. In this example, the highlighted pixels can be understood to be pixels that receive a reduced amount of light from the surface compared with the other regions of the frame. The second image shows how an integer-pixel motion along both axes (horizontal and vertical) shifts all features to new pixels, maintaining relative position. FIG. 3*e* shows the cross-correlation result. As can be seen from the cross-correlation result, the cross-correlation of the first frame and the second frame produces peak value of 4 at the (−1,−1) position, indicating best alignments at, and most likely displacement of, (−1,−1). The peak is clear and unambiguous compared with the peaks produced from coincidence or aliasing. It is to be noted that no reaggregation was performed in this scenario.

Figure 1E:
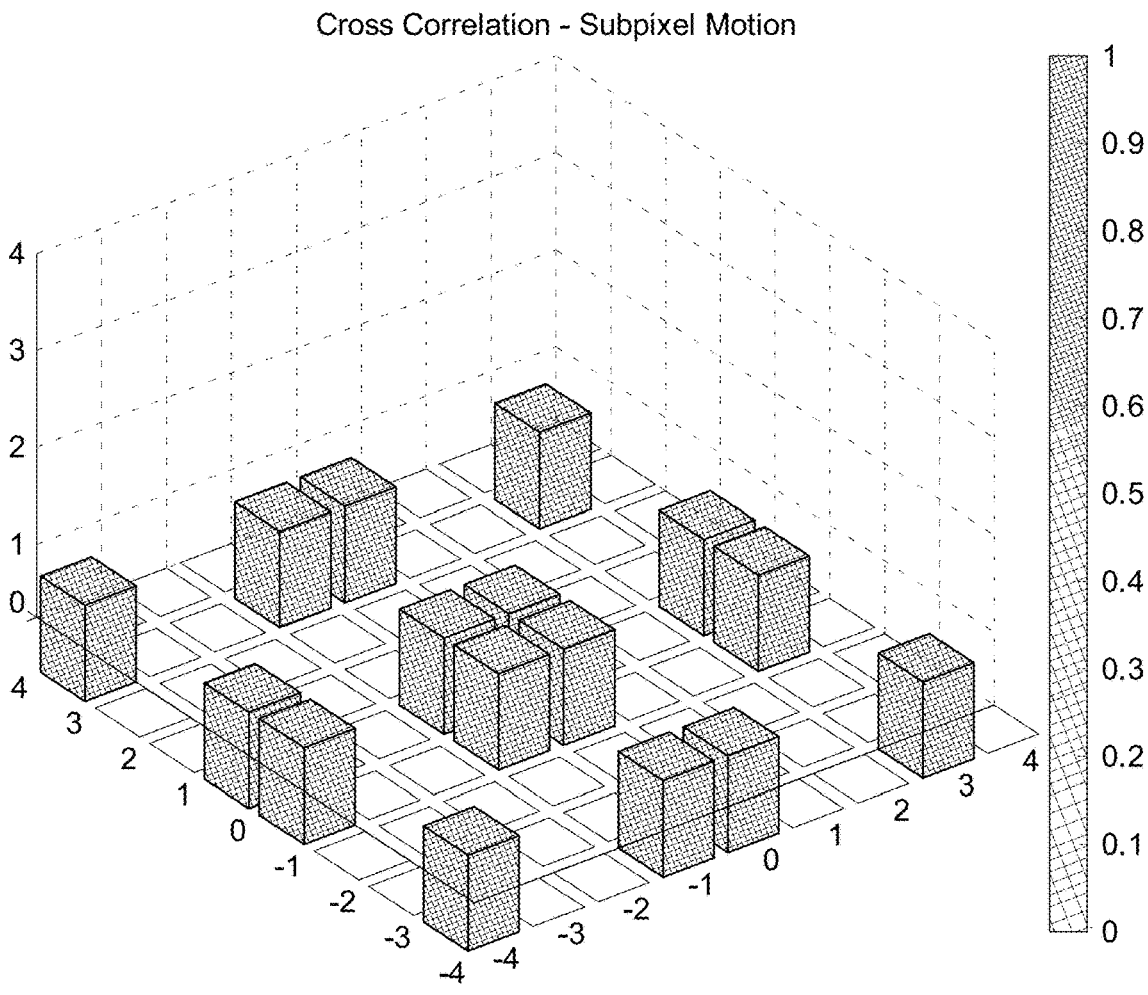

However, as explained above in connection with FIGS. 1*a* to 1*e*, subpixel motion causes only some features to move to adjacent pixels in the direction of motion. As can be seen from FIG. 1*e* showing the cross-correlation result, cross-correlation produces many competing peaks at integer pixel displacements. True peak at zero displacement (−0.5,−0.5) is split into a plateau of values indistinguishable from competing peaks. In other words, no distinct peak is present, producing ambiguity. To overcome or mitigate this problem, the present invention proposes a reaggregation operation, which is a computational step performed on the 2D cross-correlation result between the two overlapping images prior to the macropixel and subpixel calculations.

Reaggregation is the convolution of the cross-correlation result by an array of given values, in this example by a 2×2 array of values of 1. This can be thought of as summing every overlapping 2×2 group of values into a new array of reaggregated values that sit spatially at the center of each 2×2 group of raw values (i.e., values before reaggregation). FIG. 4 shows the cross-correlation result when the reaggregation operation is applied to the cross-correlation result of FIG. 1*e*. Reaggregation rebuilds the disaggregated plateau at the center into a distinct or unique peak. Competing peaks are combined with their neighbors, but grow less than the true peak. Despite more peaks in competition, the true peak is still unambiguous at the (−0.5,−0.5) position. The computationally efficient reaggregation step serves to correct the outlined issues of both macro- and subpixel calculation without any additional modification to the current algorithm.

The flow chart of FIG. 5 summarizes the proposed method according to one example. In step 101, the mouse 11 collects an initial image, referred to as image 1. In step 103, the mouse, and more precisely the ADC 17, digitizes voltages from the pixel array 15, and stores the result as frame 1. In step 104, the mouse schedules next image or sample to be collected and waits until next scheduled image collection. In step 105, the mouse collects the next image, referred to here as image 2, which in the sequence of images collected by the mouse immediately follows image 1. In other words, images 1 and 2 are consecutive images. In step 107, the mouse 11, and more precisely the ADC 17 digitizes voltages from the pixel array 15, and stores the result as frame 2. In step 109, the mouse performs cross-correlation on frame 1 and frame 2, and stores the result, which in the following is referred to as xcorr. In step 111, the mouse performs the reaggregation operation on xcorr as explained above, and stores the result as xcorr. In step 113, the mouse searches for global maximum of xcorr. In other words, the mouse identifies a global correlation peak in the cross-correlation result. The integer values along x and y coordinates are then taken as the macropixel displacement value. In this step the mouse also stores the coordinates of the distinct global maximum as macropixel value (integer value in pixels).

Now that the micropixel displacement has been determined, in step 115, the mouse performs quadratic interpolation on 3×3 array of values (i.e., the cross-correlation values in the aggregated cross-correlation result) centered on the global maximum to obtain a value for the subpixel displacement (i.e., a value from −0.5 to +0.5), and stores the obtained value as subpixel displacement. Thus, the subpixel value is a 2D value in the present 2D scenario. Instead of a 3×3 array, another array could be used, and in particular a 3×4, 4×3, or 4×4 array. In other words, the array to be used in this step is an array in the range of 3×3 to 4×4. In step 117, the mouse adds up the macropixel and subpixel values to produce total displacement, and then subtracts the value of (0.5,0.5) from the total displacement to obtain final total displacement, which is then included in a displacement report. In step 119, the mouse sends the displacement report to the host computer. In step 104, the mouse waits until next scheduled image collection, and the process then continues in step 105 where a new image is collected, and the frame count is incremented by 1. Thus, as described above, the proposed new process adds reaggregation to the cross-correlation result prior to macropixel identification (coordinates of global peak) and subpixel calculation (quadratic Interpolation). Advantageously, the process does not use distortion correction for the quadratic interpolation. It is also to be noted that the subtraction of the value of (0.5, 0.5) could instead be carried out for instance in step 113, 115, or 119.

The teachings of the present invention are further explained in the following by means of an example, where images having 20 distinct features 1, i.e., surface features are collected. FIG. 6 shows a 25×25 array of pixels sitting atop a surface (i.e., image 1) with 20 distinct features that fall under 20 separate pixels. This corresponds to step 101 in the flow chart of FIG. 5. FIG. 7 shows the position of all of the features within their pixels superimposed together. The dotted lines show that under a subpixel displacement of (+0.3, +0.4), eight of the features ought to remain underneath their original pixel, four ought to shift horizontally, 6 ought to shift up vertically, and two ought to shift diagonally. FIG. 8 shows the 1-bit digitized version of image 1, with 20 black pixels in a particular arrangement. This corresponds to step 103 in the flow chart of FIG. 5. FIG. 9 shows the 1-bit digitized version of image 2, which is generated from the same surface seen in FIG. 6, but with the pixel array shifted left by 0.3 pixels and down by 0.4 pixels. This corresponds to step 107 in the flow chart of FIG. 5.

FIG. 10 demonstrates how the features shifted between frame 1 and frame 2. Black squares match the position of features in frame 2. Black squares with a white circle are features that were static between frame 1 and frame 2. White squares with vertical, horizontal, or diagonal lines represent pixels that were occupied in frame 1, and the direction they shifted when transitioning to frame 2. The 8 static features, the two that moved diagonally, and the 4 and 6 which shifted horizontally and vertically, are all readily identifiable.

FIG. 11 shows the cross-correlation result from frame 1 and frame 2. Note the dark peak in the center, but the competing dark peak at the (4, −3) position. The 3D bar chart of FIG. 12 shows that the peak at the center (0,0) has a value of 8, matching the 8 static features, while the competing peak at (4, −3) actually has a larger value of 9. By coincidence (contrived for this example but very possible and plausible) frame 1 aligns better with frame 2 at the position of (4, −3) than (0, 0). This is because the significant subpixel displacement of (0.3, 0.4) has spread out the hypothetical peak of 20 that sits at that location into a 2×2 distribution of 6, 2, 8, and 4. This corresponds to steps 109, and 113 in the flow chart of FIG. 5, skipping reaggregation (step 111). The values of the cross-correlation centered at (0, 0) are seen in FIG. 13. Some indication of offset values from adjacent features is present with the 1s below, left, and left-up from the value of 8, though they do not contaminate the distributed peak in this example. The quadratic fit would calculate a subpixel displacement of (0.10, 0.25) which would need to be corrected for the bias towards zero. This corresponds to step 115 in the flow chart of FIG. 5 presuming the correct peak was identified over the competing false peak.

FIG. 14 shows the same cross-correlation result with reaggregation applied. The competing peak at (4, −3) is still noticeable, but the peak value at the center is now significantly more distinct (distinct global maximum correlation value). This is very apparent in the 3D bar chart of FIG. 15, which shows a value of 20 at (0, 0) while the competing peak at (4,−3) remains at a value of around 9. This corresponds to steps 109, 111, and 113 in the flow chart of FIG. 5, (including reaggregation). The values of the reaggregated cross-correlation centered on the value 20 at (0.5, 0.5) are seen in FIG. 16. The quadratic fit calculated on these values produces a subpixel calculation of (−0.20,−0.11) centered on (0.5, 0.5) for a net result of (0.30, 0.39). This is very accurate despite the adjacent-feature terms, and no correction for distortion is necessary. This corresponds to steps 115 and 117 in the flow chart of FIG. 5.

Subpixel calculation is next explained in more detail. Subpixel motion (i.e., non-integer pixel displacement in the x or y dimension) is statistically expected to shift a linearly proportional number of digital features into adjacent features, shifting the offset needed to align some common features between the first and second images by 1 pixel. Let us now consider an example according to which two images are collected, and which share 20 features in their overlapping area, and are displaced by (x,y)=(0.3, 0.4).

It is expected that a peak correlation value of 20 will exist in the cross-correlation at the coordinates (0, 0). However, with a subpixel motion of 4/10ths of a pixel in the x axis, and 3/10ths of a pixel in the y axis, it is expected that 30% of the 20 features will shift horizontally by 1 pixel, and 40% will shift vertically by 1 pixel. The expected cross-correlation values around (0, 0) in this example are:

| — | 0 | 6 | 2 |
| — | 0 | 8 | 4 |
| — | 0 | 0 | 0 |

The value of 20 from the hypothetical 'true' peak that exists at (0.3, 0.4) has been distributed into the 2×2 array of values that correspond to (0, 0), (0, 1), (1, 0), and (1, 1). In a scenario where the value of 8 has been identified as the macro-displacement at (0, 0), the 2×2 array of values could be analyzed using a linear center of mass interpolation. The calculation for the x and y subpixel displacements are the sum of the row elements and the sum of the column elements for the row and column that do not include the peak value, divided by the total value of the 2×2 area.

$$dx=(2+4)/(6+8+2+4)=6/20=0.3$$

$$dy=(2+6)/(6+8+2+4)=8/20=0.4$$

The above is the linear or center of mass interpolation. If the 2×2 array of values 6, 2, 8, and 4 were weights, the balance point would exist at (0.3, 0.4). It is mathematically accurate to how subpixel motion is expected to distribute a peak value into adjacent values. It is, however, unreliable, due to adjacent features present in either image. When inputs to a cross-correlation contain adjacent non-zero values, then the result will produce a distribution of values surrounding the peak at (0, 0), with values matching the number of adjacent features. An auto-correlation (an image cross-correlated with itself) will produce a symmetric result where the values surrounding (0, 0) indicate counts of adjacent features. As an example, let us consider the following distribution of values:

| — | 0 | 3 | 1 |
|---|---|----|---|
| — | 2 | 20 | 2 |
| — | 1 | 3 | 0 |

This indicates that there is a pair of diagonally-adjacent features, two pairs of horizontally adjacent-features, and three pairs of vertically adjacent features. We are comparing images of the same surface, so the values at the location of the cross-correlation result are expected to be similar to the auto-correlation of either image frame, centered on the location of macropixel displacement rather than (0, 0). That is to say, we expect these offsets to be present and surround our peak, and distort the values of a peak distributed by subpixel motion. Though the adjacent values themselves may also be shifted by subpixel motion, so the result is not necessarily a direct sum. An example set of values may be:

| — | 0 | 7 | 3 |
|---|---|---|---|
| — | 2 | 8 | 6 |
| — | 1 | 3 | 0 |

It is not trivial to select the top-right 2×2 array of values that include the value of 8, compared with the other 3 choices. But presuming it is chosen, the center of mass calculation would produce:

$$dx=(3+6)/(7+2+8+6)=9/24=0.38$$

$$dy=(3+7)/(7+2+8+6)=10/24=0.42$$

Here the values are no longer perfectly 0.3 and 0.4, but have been distorted by the offsets. In this particular example the error is small, but this distortion can be large, small, or non-existent. As a result, the center of mass calculation can tend to have large variance and be unreliable.

An alternative calculation is a quadratic interpolation. This is done by fitting a paraboloid to the 3×3 set of values centered on the peak, and identifying the coordinates of the peak of this hypothetical paraboloid. The location of the peak fitted to the data is taken to be the subpixel displacement.

Fitting a paraboloid to a 3×3 array of data is a standard process, and when calculated against the above example produces:

$$dx=0.31$$

$$dy=0.35$$

The quadratic interpolation solves the non-trivial problem of which 2×2 array of values to consider, by instead just considering all 9 elements centered on the largest value. It is a more reliable calculation because it has some inherent offset-correction built into the calculation. For finding the peak of a fitted parabola, the position is the same whether the input data is [2,8,6] or [0,6,4]. Because the offsets inherent in this calculation are quasi-symmetrical, this tends to be beneficial. However, the distribution generated by the subpixel displacement is linear, so fitting it to a quadratic distribution will produce a distorting bias towards zero.

A 2-dimensional example of paraboloid fitting will be cumbersome and difficult to follow, so a 1D parabola fit will be used instead to show the subpixel calculation. The same process generalizes to 2D, but it requires handling 6 times as many terms and twice as many unknowns.

Let us use a 1-dimensional example with 20 features, subpixel displacements of 0.3 and 0.4, and no interfering offsets:

Subpixel of 0.3,

Distribution: 0 14 6

Fit parabola: $ax^2+bx+c=y$ for all (x,y)

$a*-1^2+b*-1+c=0$ $a*0^2+b*0+c=14$ $a*1^2+b*0+c=6$ $a-b+c=0$ $c=14$ $a+b+c=6$ $a=-11, b=3, c=14$ x at peak of parabola$=-b/2a=-3/(2*-11)=3/22=0.1364$ (note–not the correct 0.3 value).

For subpixel of 0.4:

Distribution: 0 12 8

Following the same principles, it is obtained:

x at peak of parabola$=0.25$ (note–not the correct 0.4 value).

Given perfectly clean, undistorted data, the subpixel calculation which should yield 0.3 or 0.4 instead would give values of 0.14 or 0.25. This same phenomenon generalizes to fitting a 2D paraboloid to a 2D linear distribution. This bias towards zero is predictable and can be corrected for using a lookup table, which would map all values between –0.5 and 0.5 to other values between –0.5 and +0.5. A calculated value of 0.14 would be mapped to 0.3 and a calculated value of 0.25 to 0.4.

The quadratic fit typically requires more computation, and a follow-up correction step using a lookup table, in exchange for having a lower variance than the center of mass fitting.

However, the reaggregation step adds an additional benefit. It pre-distorts the linearly distributed data in such a way that is perfectly canceled out by the distortion imposed by the quadratic fit.

Using the same 1D examples we obtain:

Subpixel displacement of 0.3

Distribution: 0 14 6

Reaggregation applied to distribution: 0 14 20 6 0

Quadratic fit applied: 14 20 6

$a-b+c=14$ $c=20$ $a+b+c=6$ $a=-10, b=-4, c=20$ $x=-b/2a=(4)/(2*-10)=-4/20=-0.2$

But note that this quadratic fit is centering x=0 on the value of 20, which is the value generated from summing 14 and 6, and represents a macropixel displacement of 0.5 rather than 0 or 1.

So the final calculated position is 0.5+(–0.2)=0.3, which is the exact, correct subpixel value calculated from this ideal data.

Repeating this for a subpixel displacement of 0.4 we obtain:

Distribution: 0 12 8

Reagregation applied to distribution: 0 12 20 8 0

Quadratic fit applied: 12 20 8

$a-b+c=12,$ $c=20$ $a+b+c=8$ $a=-10, b=-2, c=20$ $x=-b/2a=(2)/(2*-10)=-0.1$ $x=0.5+-0.1=0.4$

13

This calculation generalizes to the 2D paraboloid fit. The end result is that applying the quadratic fit to reaggregated data removes the need to correct for the quadratic distortion caused by imposing a quadratic fit to interpolate a linear distribution. This is reaggregation's second benefit.

While the invention has been illustrated and described in detail in the drawings and foregoing description, such illustration and description are to be considered illustrative or exemplary and not restrictive, the invention being not limited to the disclosed embodiment. Other embodiments and variants are understood, and can be achieved by those skilled in the art when carrying out the claimed invention, based on a study of the drawings, the disclosure and the appended claims. Further variants of the invention may be obtained by combining any of the teachings above.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A computer-implemented method of image correlation, the method comprising:

obtaining a first image frame with a set of distinct features;

obtaining a second image frame at least partially overlapping the first image frame such that at least some of the features of the first image frame are visible in the second image frame, the first and second image frames being obtained by an image sensor comprising an array of pixels;

carrying out a cross-correlation operation of the first and second image frames to obtain a cross-correlation result indicating correlation values for different offset positions of the second image frame with respect to the first image frame, the highest correlation value with its associated offset position in the cross-correlation result indicating the most likely offset position of the second image frame with respect to the first image frame;

carrying out a reaggregation operation of the cross-correlation result to generate a distinct global maximum correlation value from a plurality of non-distinct correlation values in a reaggregated cross-correlation result, wherein the reaggregation operation involves carrying out a convolution of the cross-correlation result with a 1×2, 2×1, or 2×2 array of 1's, said convolution being carried out over every 2×2 or 1×2 or 2×1 grouping in the cross-correlation to produce a new array of values; and correcting a mouse pointer position of an optical mouse based on the distinct global maximum correlation value generated by carrying out the reaggregation operation of the cross-correlation results.

2. The method according to claim 1, wherein the convolution involves summing every overlapping 2×2 group of values into a new array of reaggregated values that sit spatially at the center of each 2×2 group of raw values before reaggregation of the cross-correlation result.

3. The method according to claim 1, wherein the value of the distinct global maximum correlation value equals or substantially equals the number of distinct features in the first and/or second image frames, when digitizing the analog value that lower analog values are assigned larger digital values, indicating more significant features from a greater reduction in light seen by a given pixel.

4. The method according to claim 1, wherein the method further comprises determining spatial displacement of the second image frame with respect to the first image frame from the position of the distinct global maximum correlation value in the aggregated cross-correlation result.

5. The method according to claim 4, wherein the spatial displacement is a two-dimensional value.

6. The method according to claim 4, wherein the method further comprises taking the integer value of the location of the distinct global maximum correlation value in the reaggregated cross-correlation result as macropixel displacement of the second image frame with respect to the first image frame.

7. The method according to claim 4, wherein the method further comprises performing quadratic interpolation on a 3×3, 3×4, 4×4, or 4×4 array of correlation values centered on the distinct global maximum correlation value of the reaggregated cross-correlation result, and taking the result of the quadratic interpolation as subpixel displacement of the second image frame (3) with respect to the first image frame.

8. The method according to claim 4, wherein the method further comprises subtracting a value of (0.5, 0.5) from the spatial displacement to obtain final spatial displacement, and including the final spatial displacement in a displacement report.

9. The method according to claim 4, wherein no correction for quadratic distortion caused by imposing a quadratic fit to interpolate a linear distribution, is made when determining the spatial displacement.

10. The method according to claim 1, wherein the image correlation method is used to track spatial displacement of an optical computer mouse.

11. The method according to claim 10, wherein the second image frame is obtained after a given time duration after the first image frame, and wherein the time duration is dependent on the movement speed of the mouse.

12. The method according to claim 1, wherein the first image frame is the immediately previous image frame to the second image frame.

13. The method according to claim 1, wherein the steps of obtaining the first and second image frames, the cross-correlation step, and the reaggregation step are carried out by an imaging apparatus, and in particular an optical computer mouse.

14. A non-transitory computer program product comprising instructions for implementing the steps of the method according to claim 1 when loaded and run on computing means of a computing device.

15. An apparatus for carrying out an image correlation process, the apparatus comprising means for:

obtaining a first image frame with a set of distinct features;

obtaining a second image frame at least partially overlapping the first image frame such that at least some of the features of the first image frame are visible in the second image frame, the first and second image frames being obtained by an image sensor comprising an array of pixels;

carrying out a cross-correlation operation of the first and second image frames to obtain a cross-correlation result indicating correlation values for different offset positions of the second image frame with respect to the first image frame, the highest correlation value with its associated offset position in the cross-correlation result indicating the most likely offset position of the second image frame with respect to the first image frame;

carrying out a reaggregation operation of the cross-correlation result to generate a distinct global maximum correlation value from a plurality of non-distinct correlation values in a reaggregated cross-correlation result, wherein the reaggregation operation involves carrying out a convolution of the cross-correlation result with a 1×2, 2×1, or 2×2 array of 1's; and correcting a mouse pointer position of an optical mouse based on the distinct global maximum correlation value generated by carrying out the reaggregation operation of the cross-correlation results.

\* \* \* \* \*